No. 882,845. PATENTED MAR. 24, 1908.
E. SACHS.
TWO SPEED DRIVING GEAR AND FREE WHEEL MECHANISM FOR CYCLES.
APPLICATION FILED FEB. 26, 1906.

2 SHEETS—SHEET 1.

Witnesses:

Inventor

No. 882,845. PATENTED MAR. 24, 1908.
E. SACHS.
TWO SPEED DRIVING GEAR AND FREE WHEEL MECHANISM FOR CYCLES.
APPLICATION FILED FEB. 26, 1906.

2 SHEETS—SHEET 2.

Witnesses:

Inventor

UNITED STATES PATENT OFFICE.

ERNST SACHS, OF SCHWEINFURT, GERMANY.

TWO-SPEED DRIVING-GEAR AND FREE-WHEEL MECHANISM FOR CYCLES.

No. 882,845.   Specification of Letters Patent.   Patented March 24, 1908.

Application filed February 26, 1906. Serial No. 302,934.

*To all whom it may concern:*

Be it known that I, ERNST SACHS, a subject of the King of Bavaria, residing at No. 5 Schultes street, Schweinfurt, in Germany, have invented new and useful Improvements in Two-Speed Driving-Gear and Free-Wheel Mechanism for Cycles, of which the following is a specification.

This invention relates to a back-pedaling coaster brake provided with a two-speed gear, and its object is the provision of a device of this character, which is simple and compact in construction, so that the appliance in its totality can be mounted within the hub of the rear wheel of a cycle, without requiring a special or unusual form or undue partial enlargement or extension of the hub-barrel.

Another object is to so construct and arrange the parts that the free-wheel action is not prejudiced by the variable speed gear, and that the hub-barrel may be readily withdrawn from the axle for purposes of revision or repair.

A further object of the invention is to release the axle from torsional or twisting strain, by so devising the clutch mechanism which serves for fixing the central gear wheel of the variable speed gear stationary or non-rotatable, that the said gear wheel is connected directly with a part attached to the frame or fork member of the cycle.

The invention further consists in a special construction of the device for axially displacing or shifting the central toothed gear of the variable speed mechanism into its operative positions, which shifting device is simple, light and durable in construction, ready to be disassembled, and insuring exact guiding and operating of the said gear wheel and coupling mechanism.

Figure 1:
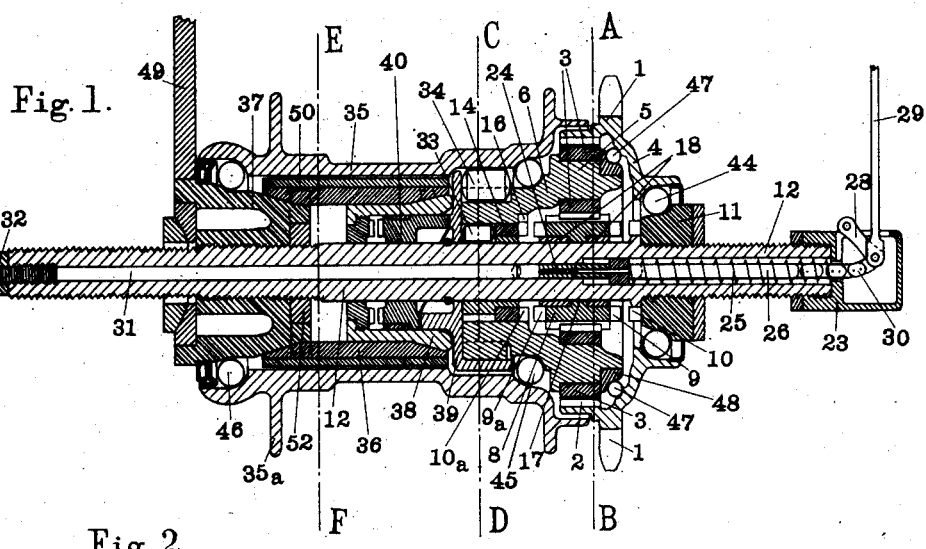
Figure 2:
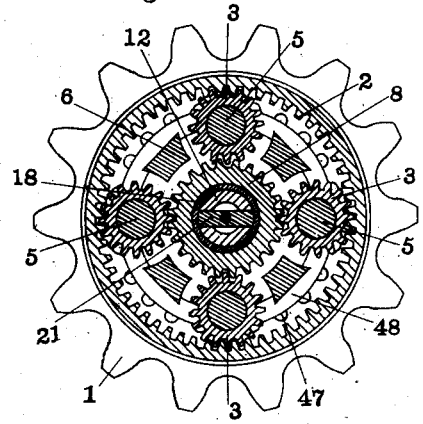
Figure 3:
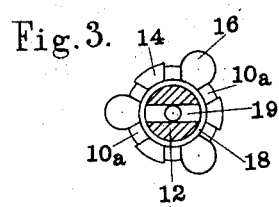
Figure 4:
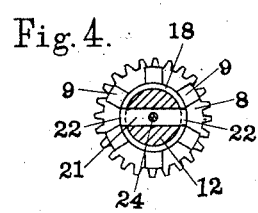
Figure 5:
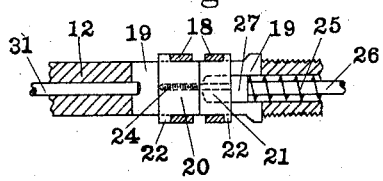
Figure 6:
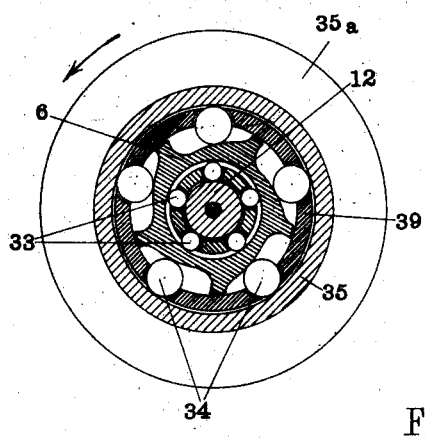
Figure 7:
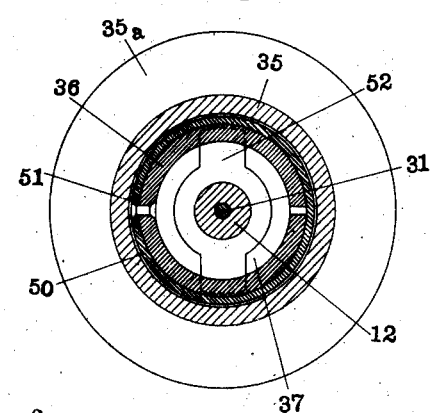
Figure 8:
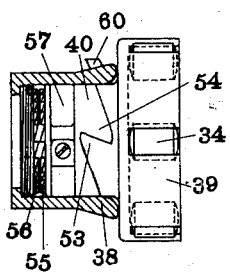
Figure 9:
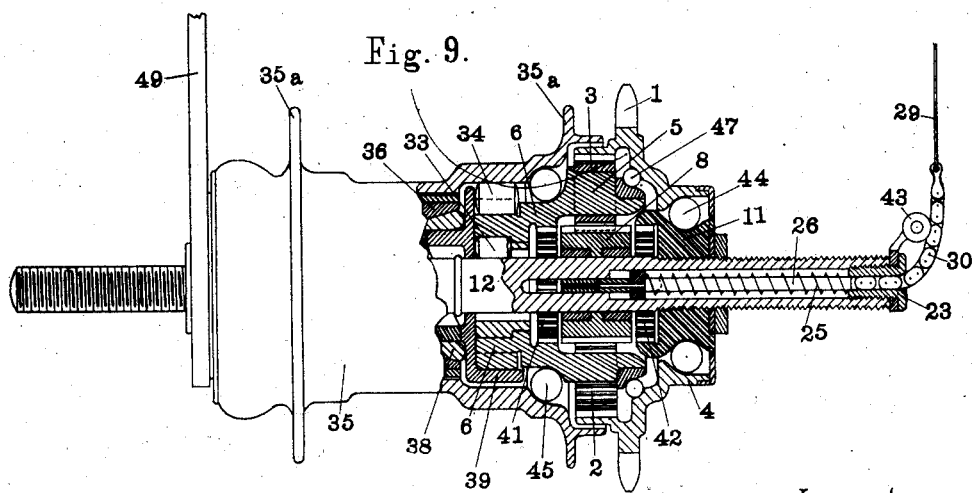

In the accompanying drawings, which form a part of this specification,—Figure 1 is a longitudinal sectional elevation of a hub and mechanism embodying the invention, Fig. 2 is a transverse section thereof on the line A—B, Fig. 1, Fig. 3 is a front view of a coupling member, Fig. 4 is an end view of the central gear wheel of the variable speed gear, Fig. 5 is a longitudinal sectional elevation of the axle, showing the shifting mechanism, Fig. 6 is a transverse section through the hub on the line C—D, Fig. 1, Fig. 7 is another transverse section through the hub on the line E—F, Fig. 1, Fig. 8 is a detail of the driving and braking mechanism, partially in section, and Fig. 9 is a modification of the coupling means for the variable speed gear in partial longitudinal sectional elevation.

Like numerals of reference correspond to like parts in the several figures.

Referring to Figs. 1 to 8 incl., the numeral 1 designates the sprocket-wheel formed on a dish-shaped body 4 and provided with an internally toothed rim 2 meshing with gear wheels 3 of a suitable number, for example four wheels, as shown in Fig. 2. The said gear wheels, rotatably mounted on pivots 5 formed with the driving sleeve 6 in one piece or rigidly connected thereto, engage a central pinion 8, mounted on the axle 12 and being capable of rotation and of axial displacement by means of a convenient operative shifting mechanism which will be referred to later on. On the end-faces of this slidable pinion are provided axially projecting teeth or claws 9 and $9^a$ respectively, having parallel lateral faces or flanks, as represented in Fig. 4. The right-hand bearing cone 11, on its inner end-face and oppositely to the axial teeth 9, has a corresponding number of radial grooves 10 with parallel lateral faces, into which grooves precisely fit the teeth 9. A coupling ring 14 facing the left-hand end of the pinion 8 and provided with radial grooves $10^a$, like the cone 11, adapted for engagement of the teeth $9^a$, is inserted in the central bore of the propelling or driving sleeve 6, and held therein against rotation with respect to the sleeve by means of projections or lugs 16 (Fig. 3) situated in corresponding recesses of the sleeve 6. By this means two coupling- or clutch-devices are provided which can be alternately brought to engagement with the axial displacement of the pinion 8 in its two end-positions. The pinion is thereby coupled with the cone 11 in the one position, thus being prevented from rotation, while when it is shifted into the other position, connection is produced with the coupling member 14, so that the pinion 8 is caused to rotate with the driving sleeve 6.

The pivots 5 for the gear wheels 3 are preferably formed or milled out on the driving sleeve 6, and at their free ends, as well as on the intermediate parts of the sleeve 6 between said pivots (Fig. 2), angular recesses are formed which serve as seats for an annular race-way 48, arranged for supporting balls 47 inserted between the said ring 48 and a ball race of the body 4 of the sprocket. A second ball cup is provided on the inner surface of the body 4 for balls 44 which run on the cone 11 screwed upon the adjacent end of the axle.

At the left end of the driving sleeve 6 and within its central bore, is arranged a ball- or roller-bearing 33 conveniently guided by a cage device, as shown in Fig. 6, which roller bearing runs upon the adjacent circumference of the axle. In the outer periphery of the sleeve 6 a ball race is formed containing balls 45 upon which the hub-barrel 35 rotates by means of a suitable ball race formed within its adjacent end, while the other end of the barrel is carried on the left bearing cone 37 by the mediation of balls 46 inserted between convenient races of the cone and the barrel.

The mechanism for axially displacing the pinion 8, in order to attain the variation of the speed to be imparted to the driving sleeve 6, is situated within a concentric bore of the axle 12, and it consists in its principal parts of the shifting device and the means for guiding the pinion and connecting it to the shifting rod. For this object the pinion 8 is rotatably mounted on two hardened steel rings 18 encircling the axle 12 and fitting the bore of the pinion, while inclosing between them an interiorly projecting annular rim 17 of the pinion so that the latter, although capable of free rotation, is carried with the axial movement of the rings. Two plates 20 and 21 diametrically arranged in a longitudinal slot 19 of the axle (Fig. 5) and held together by a threaded pin 24 formed at the inner extremity of the shifting rod 26, as shown in Figs. 1 and 5, possess at their free ends studs or lugs 22 rising above the outer periphery of the axle, and engage with lateral notches provided at diametrically opposite points of the rings 18, thus embracing the said rings and positively connecting the same to the shifting rod 26. This latter is concentrically guided within the axle by suitable means, for example a flange or expansion formed at its inner extremity or a correspondingly shaped intermediate ring 27 slipped on the pin 24, as represented in Figs. 1 and 5; the outer end of the rod 26 being continued by a flexible member, such as a chain 30 conveniently guided by a nipple or cap 23 secured to the right-hand end of the axle. The free end of the said flexible member is further guided by a link 28 pivotally fixed within the cap 23, and attached together with the link to a rod 29, a wire, a cord, or the like, which drawing means may be suitably guided or carried over pulleys on the cycle frame and connected to a hand lever fulcrumed on the frame in reach of the driver. This arrangement for actuating the shifting mechanism is not represented in the drawing, as its construction is immaterial and may be of any well-known form. Around the rod 26 is coiled a helical spring 25 bearing with its ends against the extension 27 of the rod and an internal flange or shoulder of the cap 23 respectively, so that it displaces the entire shifting device, and with this the pinion 8, to the left, as soon as the drawing rod 29 is released, thereby disconnecting the parts 9 and 10, while joining the parts 9ª and 10ª.

From the left a rod 31 is inserted into the bore of the axle and fixed therein by means of threads cut upon its outer end and engaging corresponding internal screw threads provided within the left extremity of the axle, a counter-nut 32 screwed upon the rod 31 securing the latter in its position. This arrangement allows of adjusting the rod 31 in such a manner that its inner end limits the movement of the shifting device to the left, thus avoiding any axial thrust on the driving sleeve possibly induced by the spring 25.

The propelling or driving sleeve 6 is provided with peripheral pockets or recesses of suitable number (Figs. 1 and 6), the fore ends of which (situated in the direction of the propelling motion of the driving sleeve, designated by the arrow in Fig. 6) are deeper than their rear ends, thus forming cam surfaces. Balls or rollers 34 are contained in the said recesses, forming a clutch mechanism with the same, and held in proper distances from one another by being guided or caged in convenient orifices of a retaining ring 39, so that the rolls are all together forced outwards, when the driving sleeve is rotated in the one direction, and wedged against the inner surface of the hub-barrel, thereby constituting a coupling between the driving sleeve and the hub; while they are pushed home into the deeper portion of the recesses with the opposite motion of the driving sleeve, whereby by means of the retaining ring 39 operative connection is established between the driving sleeve 6 and a brake-actuating member, which will be hereinafter described.

The brake comprises a hollow longitudinally split cylinder 36 of steel or other flexible and expansible material, having interiorly beveled ends which rest against an annular tapered surface of the left bearing cone 37 and a conical flange or beveled surface of a supporting body or sleeve 38 respectively. The flexible cylinder 36 is surrounded by and in close contact with a lengthwise split cylinder 50 made of brass or similar braking material, a key 51 (Fig. 7) being fixed lengthwise to the periphery of the cylinder 36 by any suitable means and adapted to insure the cylinder 50 against turning upon the cylinder 36 or moving lengthwise on the same. To the bearing cone 37 screwed upon the left end of the axle 12, is rigidly attached an arm or bracket 49 by means of lugs or other convenient devices, the free end of which arm is to be fixed to the adjacent fork member of the cycle in any customary manner, so that the cone 37 is effectively prevented from turning. A key 52 let into a correspondingly formed recess of the interior end-face of the left bearing cone, by means of a lug or lugs engages a longitudinal notch or notches of the cylinder 36 (Figs. 1 and 7), which is thus firmly held against rotation, but allowed of a slight axial movement. A groove-and-feather device 60 (Figs. 1 and 8) is suitably employed to lock the sleeve 38 to the cylinder 36, if it is desired to especially secure the sleeve 38 stationary or non-rotatable, besides by the friction existing between this sleeve and the brake cylinder. It will be obvious that in forcing the sleeve 38 to the left or into the cylinder 36 the flaring ends of the latter will rise upon the engaged beveled surfaces of the cone 37 and the sleeve 38, thereby being expanded or spread circumferentially as well as the cylinder 50 which will be pressed to the inner surface of the hub-barrel 35.

The means for applying the brake consist of a wedging mechanism, such as cam teeth 53, for instance, projecting from the left-hand face of the roller-retaining ring 39 and engaged with corresponding teeth 54 on a brake-actuating member 40 (Fig. 8) inclosed within the sleeve 38 and slipped on the axle, which brake-actuating member is provided with a circumferential groove and a leaf-spring 57 or the like, fixed therein with one end and bearing against the inner surface of the sleeve 38, thereby exerting friction which is slightly greater than the friction between the cam teeth 53 and 54, so that the retaining ring 39, owing to the engagement of the undercut ends of the teeth 53 and 54, carries with it the said brake-actuating member on its rotation in the one direction, while with the rotation of the retaining ring in the opposite direction the cam-surfaces of the said teeth axially displace the brake-actuating member 40 to the left by their gliding coaction, without rotating the same. On the back-face of the brake-actuating member 40 are provided teeth 55, faced by teeth 56 which are either integrally formed with the sleeve 38 or rigidly fixed thereto in any convenient manner. With the engagement of the teeth 55 and 56 a positive connection between the sleeve 38 and the brake-actuating member 40 is produced, in virtue of which the axial displacement of the latter is imparted to the sleeve 38, so as to force it into the brake-cylinder 36.

The modified construction, shown in Fig. 9, which in its essential parts corresponds to the above-described arrangement, differs with the latter in the means for coupling the central pinion 8 to the bearing cone 11 and to the driving sleeve 6 alternately, and in that an odd number of gear wheels 3 are employed. In this construction the coupling teeth on the end-faces of the pinion 8 are dispensed with, while the driving sleeve 6 and the right-hand bearing cone 11 are provided with internally toothed rims 41 and 42 respectively, into which the peripheral teeth of the pinion 8 can be engaged alternately.

Instead of a link 28, a pulley 43 can be used for guiding the flexible member 30, as shown in Fig. 9.

On the hub-barrel are preferably provided flanges 35ᵃ for the attachment of the spokes of the wheel, while at the ends of the hub-barrel and between the sprocket and the cone 11 dust-excluding caps or packings may be employed. These arrangements being well known, and their special construction being immaterial, describing of the same can be neglected.

When used in a cycle, the appliance is inserted with the ends of the axle 12 into the lugs of the rear fork of the cycle-frame and fixed therein in the usual manner by means of clamping nuts which press the fork-ends onto the bearing cones.

The device is operated as follows: When the driver, by pulling the wire 29, displaces the shifting device to the right, the middle pinion 8, shown in the drawing in an intermediate position, is moved in the same direction and coupled to the bearing cone 11 by the clutch-members 9 and 10, so that it is prevented from rotating. In propelling the sprocket-wheel in the ordinary manner by forward pedaling, the gear wheels 3 are rotated on their pivots in virtue of their meshing with the toothed rim 2 of the sprocket on the one side, and with the pinion 8 now held stationary on the other side, so that the propelling sleeve 6 is driven in the same direction with reduced velocity. If however the wire 29 is released, the spring 25 displaces the shifting mechanism to the left, thereby disjoining the parts 9 and 10 and producing interlocking of the clutch-members 9ᵃ and 10ᵃ between the pinion 8 and the propelling sleeve. This rigid connection causes the gear wheels 3 to be held stationary on their pivots, as will be easily understood; in consequence of which the propelling sleeve 6 is carried by the sprocket with the same high speed. The rotation of the driving sleeve in the forward sense, in coaction with the retarding strain of the friction-spring 57 exerted on the roller-retaining ring 39, also causes the clutch rollers 34 to rise upon the cam surfaces and to establish rigid connection between the driving sleeve and the hub-barrel by wedging action. If, on the contrary, the pedals are held stationary, the clutch rollers are slightly carried with the hub-barrel, thereby returning to deeper points of the cam-surfaces, so that the contact between the rollers and the barrel is automatically removed, and free-wheel action set up. When it is desired to apply the brake, the driving sleeve is turned rearwardly by back-pedaling. As the roller-retaining ring is dependent upon the friction spring 57, it is held stationary, until the clutch-rollers are drawn entirely inwards into the recesses of the cam-surfaces, whereby a rigid connection of the driving sleeve with the said retaining ring is produced. The further rearward motion of the driving sleeve therefore causes the cam teeth 53 and 54 to rise against each other and to displace the brake-actuating member 40 to the left, thereby engaging the clutches 55 and 56 and forcing the sleeve 38 into the brake cylinder 36, 50, which owing to the effect of the tapered faces at its ends is expanded and pressed against the inner periphery of the barrel. Propelling, free-wheel and braking therefore are common to both of the gears or speeds in this device. All ball-bearings are adjusted by the dislocation of one bearing cone only.

I have disclosed two constructional modifications in the drawings for purposes of examples, but it is obvious, that I may vary the construction in different ways, without departing from the principle of my invention. I, therefore, do not wish to be limited to the illustrated details, but

What I claim as my invention, and desire to secure by Letters Patent, is—

1. In a device for varying the speed of cycles, the combination with the hub and axle, of a sprocket-wheel not connected to said hub, a bearing-cone therefor fast on the axle, an internal hub-driving sleeve, a differential gear mechanism between said sleeve and sprocket-wheel, including an axially-displaceable central pinion between the driving-sleeve and cone, means for shifting said pinion, and means for locking said pinion with said cone in its one end-position and with said driving-sleeve in its other end-position.

2. In a device for varying the speed of cycles, the combination with the hub and axle, of a sprocket-wheel not connected to said hub, a bearing-cone therefor fast on the axle, an internal hub-driving sleeve, a differential gear mechanism between said sleeve and sprocket-wheel, including an axially-displaceable central pinion between the driving-sleeve and cone, means for shifting said pinion, and means for locking said pinion with said cone in its one end-position and with said driving-sleeve in its other end-position, a clutch-device locking said driving-sleeve to the hub only on forward propulsion, and a brake-device operated by a backward propulsion.

3. A variable speed gear for cycles, having an axially displaceable pinion; and a hand-operated shifting mechanism for the said pinion, comprising two rings encircling the hub-axle and oppositely situated within the bore of the pinion, an interiorly directed projection of the pinion inclosed between the said rings, a shifting rod movably guided within a longitudinal bore of the axle, two plates axially movable in a diametrical slot of the axle and detachably connected with one another and with the inner end of the shifting rod, and lugs at the opposite ends of the plates, exteriorly engaging recesses of the said rings, thus attaching the rings to the shifting rod in such a manner that the pinion, although being rotatable on the rings, is carried with the axial displacement of the shifting rod.

4. In a variable speed gear for cycles, having an axially displaceable pinion, the combination with a shifting mechanism for the pinion, arranged within a bore of the one end of the hub-axle; of a stop device for the said shifting mechanism, consisting of a bolt inserted from the opposite end into the bore of the hub axle; and means for adjustably fixing the said bolt.

5. In a variable speed gear for cycles, having an axially displaceable pinion, the combination with a shifting mechanism for the said pinion; of a stop device for the said shifting mechanism; and means for adjustably fixing the said stop device.

6. In a device for varying the speed of cycles, the combination with a hub proper; of a sprocket-wheel; a bearing cone therefor a driving sleeve; a differential gear mechanism between the sprocket-wheel and the driving sleeve; a middle pinion axially displaceable; clutch mechanism adapted to couple the said pinion to the adjacent bearing cone in its one end-position and to the driving sleeve in its other end-position; means for shifting the pinion; a propelling and free-wheel clutch mechanism between the driving sleeve and the hub-barrel; a hollow brake cylinder arranged to coact with the interior surface of the hub-barrel oppositely to the inner surface of the hub-barrel; and means operated by the driving sleeve and adapted to expand the brake cylinder.

7. In a device for varying the speed of cycles, the combination with a hub-axle; of a hub-barrel rotatably supported on ball bearings; bearing cones; a sprocket-wheel; a driving sleeve; a differential gear mechanism between the sprocket-wheel and the driving sleeve; a middle pinion axially displaceable; clutch mechanism adapted to couple the said pinion to the adjacent bearing cone in its one end-position and to the driving sleeve in its other end-position; means for shifting the pinion; a ball-bearing for the sprocket-wheel; a ball-bearing between the sprocket-wheel and the driving sleeve; a roller-bearing between the driving sleeve and the hub-axle; all bearings being so arranged, that they can be adjusted by the displacement of one bearing cone; a propelling and free-wheel clutch mechanism between the driving sleeve and the hub-barrel; a hollow brake cylinder oppositely to the inner surface of the hub-barrel; means located between the driving sleeve and the brake cylinder and adapted to expand the brake cylinder.

8. In a variable speed gear for cycles, having an axially displaceable pinion; and a hand-operated shifting mechanism for the said pinion, the combination with two rings encircling the hub-axle and oppositely situated within the bore of the pinion; of an interiorly directed projection of the pinion inclosed between the said rings; a shifting rod movably guided within a longitudinal bore of the axle; a flexible drawing member attached to the outer end of the shifting rod; a spring capable of automatically displacing the shifting mechanism in one direction; two plates axially movable in a diametrical slot of the axle and detachably connected with one another and with the inner end of the shifting rod; and lugs at the opposite ends of the plates, exteriorly engaging recesses of the said rings, thus attaching the rings to the shifting rod in such a manner, that the pinion, although being rotatable on the rings, is carried with the axial displacement of the shifting rod.

9. The combination with the wheel-hub and axle, of a non-attached sprocket-wheel, a hub-driving sleeve connected with the sprocket-wheel by a differential gearing, a propelling clutch-mechanism between said driving-sleeve and hub, a non-rotative brake-cylinder having a conical end, an axially shiftable tube having a conical portion coacting therewith, and a rotary and axially-shiftable brake-actuating member disjoined from said tube and rotating with the driving-sleeve on forward propulsion but adapted to be shifted axially and thereby engage with and shift said tube on backward propulsion.

In testimony whereof I have signed my name to this specification in the presence of two subscribing witnesses.

ERNST SACHS.

Witnesses:
  HENRY HASPER,
  WOLDERMAR HAUPT.